United States Patent

Torok

[15] 3,699,258

[45] Oct. 17, 1972

[54] VIDEO PROCESSING CIRCUIT FOR PRODUCING A COMPOSITE TELEVISION SIGNAL INCLUDING BLANKING AND SYNCHRONIZATION SIGNALS

[72] Inventor: Gabor Peter Torok, Lincroft, N.J.

[73] Assignee: Bell Telephone Laboratories, Incorporated, Murray Hill, N.J.

[22] Filed: June 29, 1971

[21] Appl. No.: 157,994

[52] U.S. Cl. .......................................178/7.2, 178/7.1

[51] Int. Cl. ..................................................H04n 5/40

[58] Field of Search.....178/7.1, 7.2, 69.5 TV, 69.5 G

[56] References Cited

UNITED STATES PATENTS

| | | | |
|---|---|---|---|
| 3,389,220 | 6/1968 | Buzan | 178/7.1 |
| 3,487,162 | 12/1969 | Gordon et al. | 178/7.1 |
| 3,526,710 | 9/1970 | Martin | 178/7.2 |

*Primary Examiner*—Robert L. Griffin
*Assistant Examiner*—Donald E. Stout
*Attorney*—R. J. Guenther

[57] ABSTRACT

A composite video signal is produced by combining video, blanking and sync signals in an emitter coupled transistor pair that has its collectors connected together. This is achieved by applying the video signal to the first base of the transistor pair and a reference voltage to the second base of the pair. The sync is inserted at the output terminal of the circuit, the common collector junction of the transistor pair, and blanking is inserted by clamping the video input to ground in response to the blanking signal. In a second mode, where a test signal is to be used instead of the video signal, a clamp is maintained on the video signal input; while the test signal and blanking signal are combined and applied to the second base of the transistor pair in place of the reference voltage.

7 Claims, 3 Drawing Figures

INVENTOR
G. P. TOROK
BY David P. Kelley
ATTORNEY

VIDEO PROCESSING CIRCUIT FOR PRODUCING A COMPOSITE TELEVISION SIGNAL INCLUDING BLANKING AND SYNCHRONIZATION SIGNALS

BACKGROUND OF THE INVENTION

This invention relates to video processing circuits and, more particularly, to circuits for combining video signals from a television camera with associated blanking and synchronization pulses.

Television cameras produce signals containing segments which represent the video information detected during each scanning line. These segments are separated by blanking levels. In order to transmit and reconstruct the video scene, the camera signal must be processed to assure that no video information is contained in the blanking spaces and to provide synchronization information by superimposing a sync pulse in the blanking space. Since this sync pulse is usually made shorter in duration than the blanking space, a "front and back porch" immediately preceding and following the synchronized pulse is produced.

Many circuits for forming the composite video signal have been described in the prior art. However, some difficulties have been experienced with these circuits when there is not enough black level signal to make simple clamp circuits effective. To overcome this, the prior art circuits employ more complicated and expensive arrangements, such as keyed-clamps.

In the standard video processing circuit the video signal is given a high frequency boost or pre-emphasis in order to overcome the expected greater attenuation of the high frequencies and to reduce the effect of radio interference during transmission. In order for the automatic-gain-control circuits to function properly it is also desirable to pre-emphasize the video-to-porch transitions. However, the porch to sync transitions should not be pre-emphasized since it would cause a phase error in the sync pulse. The circuits of the prior art have required expensive and complicated arrangements to achieve this desired pre-emphasis.

It is, therefore, an object of the present invention to utilize a minimum number of circuit elements to produce a composite video signal in which the black level is automatically maintained and the proper pre-emphasis is achieved.

SUMMARY OF THE INVENTION

The present invention is directed to reducing the problems of maintaining black level and proper pre-emphasis in the process of forming a composite video signal by utilizing a transistor pair that is emitter and collector coupled. This arrangement allows for the use of a small number of circuit elements and the inclusion of various other special system functions.

In an illustrative embodiment of the invention a first transistor has its emitter connected to the emitter of a second transistor and, through a first resistance, to a first reference voltage. The collector of this first transistor is connected to the circuit output, the collector of the second transistor and, also, through a second resistance, to a second reference voltage. A clamped video signal, such as would be obtained from a television camera, is applied to the base of the first transistor through a resistor and the base of the second transistor is connected both to a third reference potential through a third resistance and to ground through a diode and saturated transistor.

In addition, the anode of a diode is connected to the base of the second transistor. The cathode of this diode is connected to ground through the collector-emitter path of a third transistor. In the normal mode of operation this third transistor remains saturated because of a bias network connected to its base. Therefore, the voltage at the base of the second transistor is approximately one diode drop above ground. This emitter and collector coupled transistor pair functions somewhat like an OR gate for analog signals. Whichever base signal is most positive will appear amplified and inverted at the circuit output. The smaller signal will be blocked because the base-emitter junction of the transistor to which it is applied will be reverse biased by the larger signal. In the first mode of operation of the circuit, the video signal is always the most positive and is therefore the signal that is transmitted to the output. However, if the video signal is not properly clamped and it begins to drift, the second transistor of the pair will turn ON and automatically maintain the black level in the composite video signal.

Blanking for the composite video signal is achieved with a fourth transistor connected in a common emitter amplifier configuration. This fourth transistor has a blanking signal applied to its base through a fourth resistance, its emitter connected to ground and an output signal developed across a fifth resistance connected between its collector and the third reference potential. The output of this fourth transistor is applied through a sixth resistance to the base of a fifth transistor whose collector emitter path is connected between the base of the first transistor and ground. Also, the collector of this fourth transistor is connected to the second reference potential through seventh, eighth and ninth resistances which are in series.

The blanking signal is normally high, but it goes to zero during the blanking period. This causes the fourth transistor to turn OFF and the fifth transistor to saturate, thereby shorting the video input to ground. This assures that there will be no video in the blanking region of the composite signal. The sync pulse is mixed into the properly clamped and blanked video signal through a tenth resistance connected to the output of the circuit. Also, pre-emphasis is achieved with a network comprising a resistor and capacitor, in series, which is connected from the emitter junction of the first and second transistors to ground. This network will boost the high frequencies of the video input and sharpen the video to blanking (porch) transitions. However, it will not have any effect on the sync pulse which is inserted at the output.

If the present invention is used in a video-telephone system, it would be desirable to transmit a test pattern of some form when the sender does not want his picture transmitted. In the second (one-way) mode of operation for the circuit, this test signal is applied to the collector of the third transistor and thereby through the diode to the base of the second transistor. This one-way mode is initiated by closing a switch which effectively connects the junction of the eighth and ninth resistances to ground through an eleventh resistance. Since the bias for the base of the third transistor is developed by connecting it to the junction of the seventh and eighth resistances, the closing of the switch has the effect of taking the third transistor out of the saturated state, cutting it off, and allowing the one-way signal to pass through the diode to the base of the second transistor. The action of this switch also causes the base of the fifth transistor to be grounded, effectively shorting the video input to ground through its base emitter diode. Therefore, the test signal will be amplified and transmitted to the output. However, during the blanking interval, transistor 4 will cause transistor 3 to saturate, thus assuring that none of the test signals will be in the blanking space.

The foregoing and other features of the present invention will be more readily apparent from the following detailed description and drawings.

DETAILED DESCRIPTION

Figure 1:
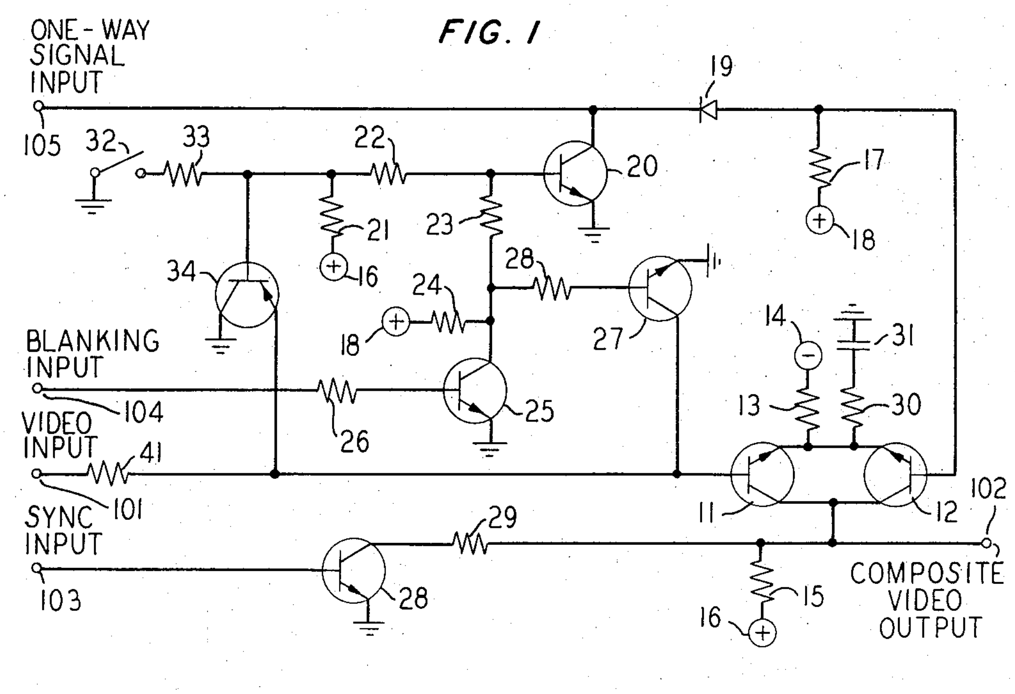
FIG. 1 is a schematic diagram of an illustrative embodiment of the invention.

FIG. 1 is a schematic diagram of a circuit which utilizes the principles of the present invention to generate a composite video signal. The video signal applied to input terminal 101 is the type which is typically produced by a television camera and is represented by Curve A of FIG. 2. It has segments (50) which contain video information representative of the scan lines of the camera, separated by blanking intervals (51). Before it is applied to input terminal 101 of the circuit, the camera signal is preamplified and clamped. This clamped video signal is applied to the base of transistor 11 through resistor 41 which has its emitter connected to the emitter of transistor 12 and its collector connected to the collector of transistor 12. A resistor 13 is connected between the common emitter junction of transistors 11 and 12, and a negative reference potential 14. Also, a resistor 15 is connected between the common collector junction of transistors 11 and 12, and a positive reference potential 16. This common collector junction is also connected to the circuit output terminal 102. In the normal mode of operation a reference voltage of about 0.7 volt is applied to the base of transistor 12. This voltage is typically less than the video input voltage and its generation will be described below. The common emitter and collector transistor pair (11 and 12) forms a circuit which functions somewhat like an OR gate for analog signals, with the bases of the transistors as inputs and the common collector junction as the output. The input signal that is most positive will appear amplified and inverted at the output. However, the smaller signal will be blocked because the base-emitter junction of the transistor to which it is applied will be reverse biased by the larger signal. This arrangement differs from a digital OR gate in that the emitter voltage of the transistor pair is not fixed at a reference voltage, but assumes a value dependent on the largest input signal.

The base of transistor 12 is connected to a reference potential 18 through a resistor 17. In addition, the anode of a diode 19 is connected to the base of transistor 12. The cathode of diode 19 is connected to ground through the collector-emitter path of a transistor 20. In the normal mode of operation of the circuit, this transistor 20 is in saturation because of the voltage applied to its base from reference potential 16 through resistors 21 and 22, which are in series. Therefore, the base of transistor 12 is maintained at a voltage equal to one diode drop above ground. The resistor 17 is made large enough that a full diode drop is not developed across diode 19. This is done so that the sum of the saturation voltage of transistor 20 and the voltage drop across diode 19 will equal a full diode drop (approximately 0.7 volt). Under these conditions, the video signal will always be the most positive and will be transmitted to the output. However, if the video is not properly clamped and it drifts in the negative direction, its negative excursions will eventually be less than the diode voltage on the base of transistor 12. When this happens the diode voltage will be transmitted to the output instead of the video. This has the effect of automatically maintaining the black level in the composite video despite a loss of clamp. If this were not done some of the video signal could drift into the region between $V_1$ and $V_2$ in Curve D of FIG. 2, thereby destroying the sync information. This loss of clamp usually occurs when a simple clamp circuit is used and there is very little black level in the scene. Therefore, using the present invention allows for the use of a simple clamping circuit in the stages of the video signal processing which precede it.

Figure 2:
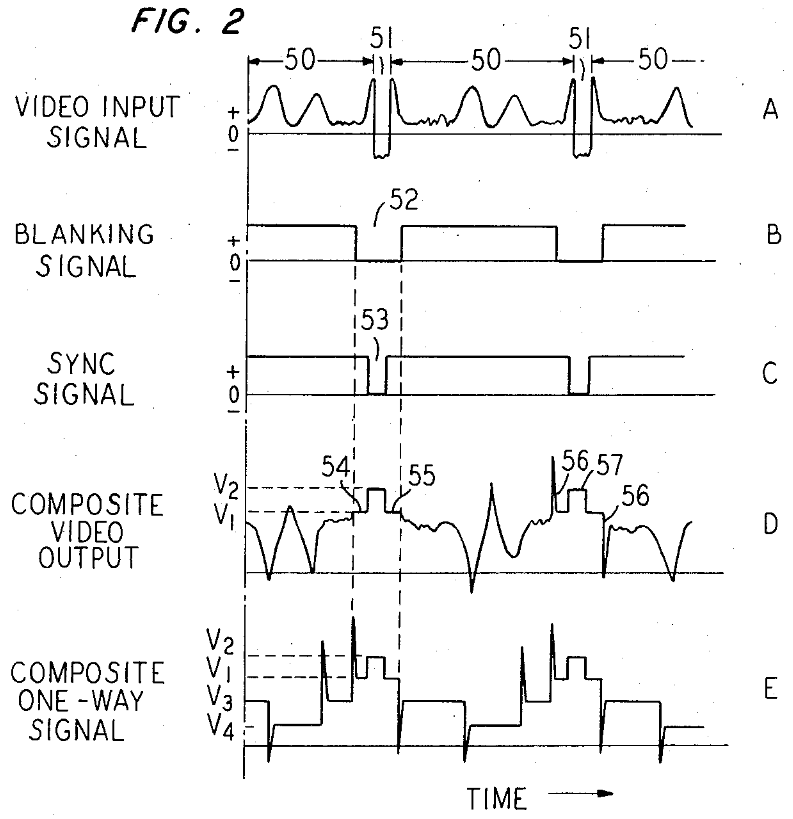
FIG. 2 is a set of waveforms useful in explaining the operation of the embodiment shown in FIG. 1.

The blanking signal at terminal 104, which is represented by Curve B of FIG. 2, is coupled to the base of a transistor 25 through a resistance 26. The emitter of transistor 25 is connected to ground and its collector is connected to the junction of resistors 23, 24 and 28. Since the blanking signal is normally high, transistor 25 is in saturation during the active video period. This blocks any contribution to the bias voltage of transistor 20 from reference potential 18; however, the resistors 21, 22 and 23 are selected so that transistor 20 remains in saturation. During the blanking interval (52) the blanking signal goes to zero, thereby producing a positive pulse at the collector of transistor 25. This positive pulse is coupled to the base of a transistor 27 through a resistor 28. The collector of transistor 27 is connected to the base of transistor 11 and its emitter is connected to ground. Therefore, this transistor 27 will short out the video input during blanking, causing the diode voltage on the base of transistor 12 to be transmitted to the output.

The sync signal at terminal 103, which supplies information to the receiver concerning the start of a scan line, is applied to the base of transistor 28. A typical sync signal is shown in Curve C of FIG. 2. The emitter of transistor 28 is connected to ground and its collector is coupled to output terminal 102 through resistor 29. Since the sync signal is normally high, transistor 28 is in saturation most of the time. However, during the blanking interval it goes low (53), producing a positive pulse at the collector of transistor 28 which is resistively added to the diode voltage transmitted to the output during blanking. This generates the composite video signal represented by Curve D of FIG. 2 at the output of the circuit. The spikes on the Curve D and E of FIG. 2 represent the effect of the pre-emphasis to be discussed later. Since the sync signal is shorter in duration than the blanking signal, a "front and back porch" (54 and 55) are produced, which precede and follow the sync pulse, respectively.

In transmitting a composite video signal the high frequencies are usually attenuated more than the low frequencies. Also, radio frequency interference has a greater effect on the small high frequency signals. To overcome these problems the high frequencies are usually pre-emphasized or boosted. This is accomplished in the present invention by resistor 30 and capacitor 31 connected in series between the common emitter junction of the transistor pair (11 and 12) and ground. Placing the pre-emphasis at this point allows the high frequency video information to be boosted and also the video-to-porch transitions (56). However, the sync pulse is not pre-emphasized. This is an important feature because pre-emphasis of the video-to-porch transitions aids in automatic gain control; but, pre-emphasis of the sync would cause a phase error which would hinder reconstruction of the video signal at the receiver. This pre-emphasis is represented by the spikes in Curves D and F of FIG. 2.

When the present invention is used to process signals in a video telephone system it is a simple matter to include special functions which would be desirable in such a system. A very important function in such a system would be a privacy or one-way mode of operation. In such a mode the sender transmits only voice information, the video signal being blocked. So that the receiver will know that his set is working, a test or one-way signal is sent in place of the normal video signal. This one-way mode of operation is initiated by closing switch 32, thereby coupling a ground potential to the junction of resistors 21 and 22 through resistance 33. Resistance 33 is low enough in resistance that the grounding of one side of it through switch 32 will cause transistor 20 to turn OFF during the normal active video time. This allows the one-way signal at terminal 105 to be coupled to the input of transistor 12 through diode 19. The video signal in this mode is clipped by transistor 34 whose base-emitter path is connected between the base of transistor 11 and ground through resistor 33. The base of transistor 34 is connected to the junction of resistors 21 and 22. In the normal operating mode this transistor acts as a clipper, eliminating any video signal which is more positive than the voltage at the junction of resistors 21 and 22. However, in the one-way mode it eliminates all the video signal since its clipping voltage level is essentially ground.

Blanking is achieved in the one-way mode because the blanking pulse at the collector of transistor 25 causes transistor 20 and 27 to saturate. This will cause the diode voltage drop to be transmitted to the output during blanking since the saturation voltage of transistor 27 at the base of transistor 11 will be less than the diode voltage at the base of transistor 12. The change in operating modes has no effect on the sync pulse so the composite video would be the same as that shown in Curve E of FIG. 2 where the test signal is at $V_3$ during the first and last third of the video interval and at $V_4$ during the second interval.

Figure 3:
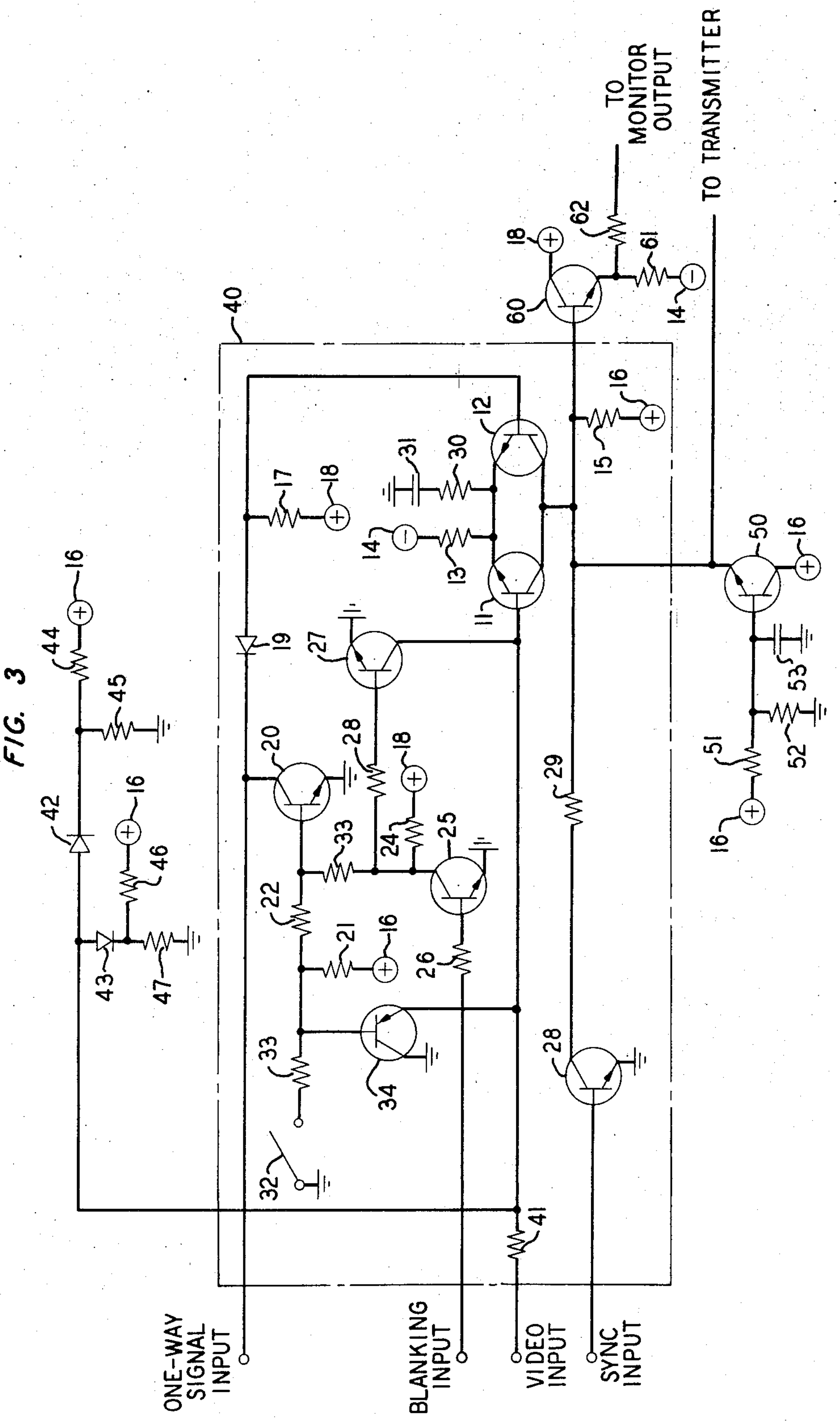
FIG. 3 is a schematic diagram of a more complete video processing circuit utilizing the invention.

Some additional video processing functions, which are easily provided when the present invention is used as a signal processing circuit, are shown in FIG. 3. The circuit of FIG. 1 is included in FIG. 3 as element 40 and all of its parts have the same designation that they had in FIG. 1. One of the functions included in the circuit of FIG. 3 is gamma correction of the video signal. This introduces nonlinearity in the light to voltage transfer characteristic of the camera and is provided by the diodes 42 and 43. This nonlinearity cancels voltage to light non-linearity in the receiving cathode ray tube. The cathode of diode 42 is connected to the junction of resistors 44 and 45, which are connected in series between the positive reference potential 16 and ground. The anode of diode 42 is connected to that end of a resistance 41 that is connected to the video input of the circuit 40. The other end of resistance 41 is connected to the preceding video processing stages. Diode 43 has its anode connected to the anode of diode 42 and its cathode connected to the junction of resistors 46 and 47, which are connected in series between the positive reference potential 16 and ground. The resistances 44, 45, 46 and 47 are chosen so that small video input signals will be unaffected, but larger signals will cause diode 42 to conduct, thereby producing a reduction in gain, due to the voltage division caused by resistance 41 and the parallel combination of resistors 44 and 45. Still larger signals will cause both diodes 42 and 43 to conduct, reducing the gain further. This will produce a three-segment piece-wise linear approximate to a curve which introduces the gamma correction into video signal.

Another function which is included in the circuit of FIG. 3 is the white level clipping performed by transistor 50. Transistor 50 has its collector connected to positive reference potential 16 and its emitter connected to the output of circuit 40. The base of transistor 50 is connected to the junction of resistors 51 and 52, which are connected in series between reference potential 16 and ground. These resistors establish a voltage at the base of transistor 50 which is less positive than the largest expected negative video excursion (see Curve D, FIG. 2). Therefore, transistor 50 is normally OFF. However, if the output signal is less positive than expected, this transistor will turn ON and clip the signal at a voltage determined by the ratio of resistors 51 and 52. A capacitor 53, which allows for clipping of transients, is connected between the base of transistor 50 and ground. Clipping in the black (positive) direction occurs when the pre-emphasized video signal becomes more positive than reference voltage 16.

In addition to the other functions provided by the circuit of FIG. 3, the local viewing of the composite video signal without disturbing transmission can be achieved by driving a local monitor with an emitter follower connected to the output of circuit 40. In FIG. 3 this emitter follower is formed by transistor 60, which has its base connected to the output of circuit 40, its collector connected to reference potential 18 and its emitter coupled to negative reference potential 14 through resistance 61. The emitter of transistor 60 is connected to the local monitor through resistance 62.

A unique arrangement for generating a composite video signal has been described. This circuit provides proper pre-emphasis and automatically maintains the black level. In addition, it utilizes a relatively small number of parts and is particularly suited for the addition of special functions, such as the one-way mode, gamma correction and double-ended clipping. While the invention has been particularly shown and described with reference to preferred embodiments thereof, it will be understood by those skilled in the art that various changes in form and details may be made therein without departing from the spirit and scope of the invention.

I claim:

1. A mixing circuit for combining a video signal with blanking and synchronization pulses to form a single composite signal having recurrent blanking levels within which a sync pulse occurs, said circuit comprising:

an emitter and collector coupled transistor pair having a first input at the base of one of the transistors of the pair, a second input at the base of the other transistor and an output at the common collector junction of the transistors;

a first reference potential;

a first resistance connected between the common collector junction of said transistor pair and said first reference potential;

a second reference potential;

a second resistance connected between the common emitter junction of said transistor pair and said second reference potential;

means for applying the video signal to the first input of said transistor pair;

means for applying a third reference potential to the second input of said transistor pair, means for shorting the video signal to ground in response to blanking signals; and means for coupling the synchronization pulses to the output of said transistor pair during the period of a blanking signal.

2. A circuit as claimed in claim 1 wherein said means for applying a third reference potential to the second input of said transistor pair comprises:

a fourth reference potential;

a third resistance connected between the second input of said transistor pair and said fourth reference potential;

a diode having its anode connected to the second input of said transistor pair;

a third transistor having its collector connected to the cathode of said diode and its emitter connected to a point of ground potential; and a means for biasing the base of said third transistor.

3. A circuit as claimed in claim 2 wherein said means for shorting said video signal comprises:

a first blanking transistor having its emitter connected to ground;

a first blanking resistor which couples said blanking pulse to the base of said first blanking transistor;

a voltage source;

a second blanking resistor connected between the collector of said first blanking transistor and said voltage source;

a second blanking transistor having its emitter connected to ground and its collector connected to the first input of said transistor pair; and a third blanking resistor connected between the collector of said first blanking transistor and the base of said second blanking transistor.

4. A circuit as claimed in claim 1 wherein said means for coupling said synchronization pulses to the output of said transistor pair comprises:

a synchronization transistor having said synchronization pulses applied to its base and its emitter connected to ground, and a synchronization resistance connected between the collector of said synchronization transistor and the circuit output.

5. A circuit as claimed in claim 3 wherein said means for biasing the base of said third transistor comprises first, second and third biasing resistors connected in series between said second reference potential and the collector of said first blanking transistor, the junction of said second and third biasing resistors being connected to the base of said third transistor.

6. A circuit as claimed in claim 1 further including a pre-emphasis network for boosting high frequency video signals and video to porch transitions comprising a resistor and capacitor in series connected between the common emitter junction of said transistor pair and a point of ground potential.

7. A circuit as claimed in claim 5 further including a means for substituting a test signal in place of said video signal, said means for substituting a test signal comprising:

means for applying said test signal to the collector of said third transistor;

a fourth transistor of opposite polarity from the other transistor of the circuit having its emitter connected to the first input of said transistor pair, its collector connected to a point of ground potential, and its base connected to the junction of said first and second biasing resistors;

a test signal resistance having its first end connected to the junction of said first and second biasing resistors; and a switch connected between a point of ground potential and the second end of said test signal resistance, said switch being open when the video signal is to be combined and closed when the test signal is to be combined so that said means for biasing the base of said third transistor will cause said third transistor to cut off between blanking pulses and said fourth transistor to be clamped to ground through said test signal resistance as long as said switch is closed.

* * * * *